United States Patent [19]  [11]  3,898,316
Flood et al.  [45]  Aug. 5, 1975

[54] CALCINATION OF GYPSUM
[75] Inventors: Frank Geoffrey Flood, Welwyn;
   Norman McLoughlin, Nottingham;
   Kenneth Wood Jones,
   Loughborough; Clive Offley Court,
   Nottingham, all of England
[73] Assignee: BPB Industries Limited, England
[22] Filed: Aug. 28, 1973
[21] Appl. No.: 392,389

[30] Foreign Application Priority Data
   Sept. 1, 1972   United Kingdom........... 40748/72
[52] U.S. Cl................................ 423/171; 106/109
[51] Int. Cl. ............................................. C01f 1/00
[58] Field of Search ........... 106/110, 109, 170, 171;
                                                    423/167, 172

[56]    References Cited
   UNITED STATES PATENTS
1,370,581  3/1921  Brookby ............................ 106/110
1,960,538  5/1934  Hoggart ............................ 106/110
   FOREIGN PATENTS OR APPLICATIONS
267,044   6/1966  Australia............................ 106/110

*Primary Examiner*—Winston A. Douglas
*Assistant Examiner*—John P. Sheehan
*Attorney, Agent, or Firm*—Kenneth E. Roberts, Esq.;
Stanton T. Hadley, Esq.; Samuel Kurlandsky, Esq.

[57]    ABSTRACT

The rate of production of gypsum plaster by a continuous calcination process, in which a mass of gypsum being calcined is maintained in a fluidized condition predominantly by the water vapour evolved during calcination, can be considerably increased and a plaster product of reduced water demand be obtained by introducing an aridizing agent such as calcium chloride along with the gypsum and controlling the temperature in the vessel at a value substantially below that previously employed, i.e. below 150°C. Preferred processing conditions are a temperature within the range 120° to 140°C and a residence time of 60 to 145 minutes and the preferred concentration of aridizing agent is from 0.05 to 1% by weight of the gypsum.

7 Claims, No Drawings

CALCINATION OF GYPSUM

The present invention relates to the calcination of gypsum, and more especially to a process of continuous calcination in a vessel whose contents are maintained in a fluidized state by the vapour evolved during calcination, as described and claimed in our British Pat. No. 1,018,464. As described in that Patent and as operated hitherto, the temperature in the vessel is controlled in the region of 150°C.

The process of aridization, in which a gypsum plaster of reduced water demand is obtained by calcination in the presence of a salt or other compound of high affinity for water (a so-called "aridizing agent") is well known and was described, for example, in U.S. Pat. No. 1,370,581. We have found, however, that the inclusion of an aridizing agent in the feed for continuous calcination as described in our said Patent does not afford any advantage.

Nevertheless, it has now been found that if an aridizing agent is included in the gypsum to be calcined by a continuous process but the process is operated at a substantially lower temperature than has hitherto been the case, there are achieved both an increase in the throughput or production rate of the process and also a product having a reduced water demand. For this result both conditions, i.e. the presence of an aridizing agent and the lower operating temperature, are necessary. In the absence of these conditions the product will either be incompletely calcined or will not exhibit any aridization effect, or may suffer in both respects.

Accordingly the process of the invention comprises a procedure wherein finely divided gypsum is introduced continuously into a calcination vessel in which a mass of the gypsum is heated to dehydrate it and is maintained in a fluidized condition, and a calcined product consisting substantially of calcium sulphate hemihydrate is continuously discharged, characterized in that the gypsum is introduced into the vessel together with an aridizing agent and the temperature in the vessel is maintained below 150°C.

The temperature of operation is preferably maintained within the stated range, and can be adjusted by varying the throughput of gypsum or the input of heat energy, or both. At temperatures above 140°C the increase in production rate at a given heat input rate, and the effect of the aridizing agent becomes less significant. Below 120° the proportion of residual gypsum in the product becomes undesirably great.

The invention is principally and preferably applicable to that continuous calcination technique wherein the material being calcined is maintained in a fluidized condition solely or substantially solely by the water vapour evolved by the material itself. Although assisted fluidization techniques can be employed for the purposes of the invention they are of little advantage because the temperature of operation should still lie within the stated range for the reasons given, and at these temperatures fluidization can normally be achieved without the injection of fluidizing gas.

In practical operation it has been observed that the conversion of a conventional kettle to continuous operation in accordance with U.S. Pat. No. 1,018,464 can give an increase in production of up to 30%. It has now been observed that the adoption of the present invention can give a further increase in production of the same order, without altering the heating rate of the kettle.

Known aridizing agents include water-soluble or hygroscopic salts, both inorganic and organic, and such compounds of high water affinity as hydrogen chloride. For the purposes of this invention the agents primarily of interest are inorganic chlorides, and more especially such soluble chlorides as those of calcium, sodium and magnesium, the first-mentioned being particularly preferred.

It is preferred to employ an amount of at least 0.05% of an inorganic chloride such as calcium chloride, based on the weight of gypsum. Little advantage has been found for concentrations above 0.1%, but there is no critical upper limit. An excessive amount of the agent could bring about such effects as undue load on stirring mechanism employed in the calcination vessel (which in the case of our experiments has been a kettle fitted with a conventional agitator), but we have used up to 0.5% calcium chloride without difficulty.

The residence time of material in the calcination vessel is not critical, although it must clearly be long enough for substantially complete calcination to be ensured. Good results have been obtained with residence times of 60 – 145 minutes.

The following example illustrates the practice of the invention and the effect of departing from the preferred conditions. All percentages are given by weight.

Ground gypsum having a chloride ion content of 0.007% was calcined by a continuous process by introducing the gypsum continuously into the top of a conventional gypsum calcination kettle modified by the addition of an upwardly directed pipe leading from the lower region of the interior of the kettle to an overflow discharge at substantially the same level as the top of the contents of the kettle, as described in British Pat. No. 1,018,464. The contents of the kettle were indirectly heated by an external burner in the conventional manner.

A number of runs was carried out both with and without the admixture of calcium chloride with the raw gypsum as aridizing agent and at different controlled operating temperatures. The properties of the products obtained are given in the following table:

TABLE

| Control Temperature (°C) | CaCl$_2$ Addition Level (%) | Water Demand (ml/100g. Plaster) | Change in Water Demand | Residual Gypsum (%) |
|---|---|---|---|---|
| 160 | NIL | 70 | | 4.8 |
| | 0.1 | 68 | 2 | 3.2 |
| 150 | NIL | 68 | | 4.6 |
| | 0.1 | 68 | 0 | 2.8 |
| 138 | NIL | 72 | | 4.7 |
| | 0.1 | 68 | 4 | 2.9 |
| 130 | NIL | 82 | | 5.3 |
| | 0.1 | 68 | 14 | 5.1 |
| 125 | NIL | 79 | | 8.2 |
| | 0.1 | 61 | 18 | 5.4 |
| 120 | NIL | 68 | | 21.7 |
| | 0.1* | 66 | 2 | 10.0 |
| 115 | NIL.* | 66 | | 38.3 |
| | 0.1* | 62 | 4 | 11.5 |

*During these calcinations it was necessary to introduce fluidizing air to ensure smooth discharge from the kettle.

These results show that at usual operation control temperatures for the continuous process, i.e. 150° to 160°C, chloride additions have little effect on water demand. Below 120°C the amount of fluidization due to the calcination reaction is so poor that deliberate air additions had to be made to ensure satisfactory operation of the kettle. In addition the residual gypsum levels were undesirably high, and though the presence of chloride ions reduced the residual gypsum level considerably, it was still above 5%, which is the maximum normally acceptable in commercial hemihydrate plasters.

We claim:

1. A process for the calcination of gypsum comprising the steps of:
   introducing finely divided gypsum continuously into a calcination vessel;
   introducing an hygroscopic salt aridizing agent continuously into said vessel;
   heating the material in said vessel at a temperature about above 120° and below 150°C to dehydrate said gypsum while maintaining said gypsum undergoing dehydration in a fluidized condition; and
   discharging continuously from said vessel a calcined product consisting substantially of calcium sulphate hemihydrate.

2. A process according to claim 1 wherein the material in said vessel is maintained within the temperature range of about 120° to 140°C.

3. A process according to claim 1 including the preliminary step of admixing said aridizing agent in effective amount with said finely divided gypsum before the introduction thereof into said vessel.

4. A process according to claim 1 wherein said aridizing agent comprises a water-soluble inorganic chloride in an amount of 0.05 to 1% by weight of said gypsum.

5. A process according to claim 1 wherein the residence time of said gypsum in said vessel is from 60 to 145 minutes.

6. A process for the calcination of gypsum comprising the steps of:
   introducing finely divided gypsum continuously into the upper part of a calcination kettle fitted with an upwardly directed discharge pipe leading from the lower region of said kettle to an overflow at substantially the level of the top of the vessel contents;
   continuously introducing an hygroscopic salt aridizing agent in effective amount into said upper part of said kettle;
   indirectly heating the contents of said kettle at a temperature within the range of about 120° to 140°C to dehydrate said gypsum and to maintain said contents in a fluidized condition by means of water vapour evolved in said dehydration; and
   continuously discharging from said kettle by way of said pipe and overflow a calcined product consisting essentially of calcium sulphate hemihydrate.

7. A process according to claim 6 wherein from 0.05 to 1% by weight of calcium chloride is admixed with said gypsum before the introduction thereof into said kettle.

* * * * *

UNITED STATES PATENT OFFICE
CERTIFICATE OF CORRECTION

Patent No. 3,898,316                    Dated August 5, 1975

Inventor(s) Frank Geoffrey Flood, et al.

It is certified that error appears in the above-identified patent and that said Letters Patent are hereby corrected as shown below:

In column 2, in the TABLE, the numbers in the fourth column under the heading "Change In Water Demand", reading downward, should appear as follows:

-2, 0, -4, -14, -18, -2 and -4.

Signed and Sealed this sixth Day of January 1976

[SEAL]

Attest:

RUTH C. MASON
Attesting Officer

C. MARSHALL DANN
Commissioner of Patents and Trademarks